United States Patent [19]
Faust et al.

[11] 3,763,565
[45] Oct. 9, 1973

[54] METHOD AND APPARATUS FOR ESTABLISHING PROPER INTEROCCLUSAL DISTANCE FOR EDENTULOUS DENTURE PATIENTS

[76] Inventors: Henry H. Faust, 319 E. First St.;
Peter J. Faust, 1800 Rickety Ln., both of Tyler, Tex. 75701

[22] Filed: Jan. 28, 1972

[21] Appl. No.: 221,573

[52] U.S. Cl. .................................................. 32/19
[51] Int. Cl. .............................................. A61c 9/00
[58] Field of Search ...................... 32/18, 19, 20, 21

[56] References Cited
UNITED STATES PATENTS
3,153,282  10/1964  Brewer................................... 30/19
3,131,475   5/1964  Craigo et al. .......................... 32/19

Primary Examiner—Robert Peshock
Attorney—E. Hastings Ackley

[57] ABSTRACT

A method and apparatus for determining the proper vertical or interocclusal distance for upper and lower dentures of edentulous denture patients to obtain most efficient chewing ability and establishing proper freeway space for unimpaired speech which includes use of magnetic gauge plates on one of the upper or lower denture base plates disposed to be spaced from the biting edges or incisals of central anterior or incisor teeth mounted on the other base plate to establish the proper relationship during normal movement of the wearer's mandible with respect to the maxilla during normal speech functions. The apparatus includes magnetic gauge plates adapted to be supported on a supporting platform affixed to one of the denture base plates, and which are formed with predetermined thickness to enable the dentist to build up the proper height of the exposed surface of the gauge plates to a dimension representing the edges or incisals of the central anterior or incisor teeth for such denture to establish the proper freeway space between the incisal edges of the anterior or incisor teeth on the dentures. The gauge plates are adjustable to accommodate horizontal prognatic or retrusive overjet where required. The magnetic character of the gauge plates positively holds the same in position on platform fixed to the denture base plate when the proper vertical dimension has been determined and established. The spacing is preferably established by use of a phonetic chart or reading card having a series of words or a sentence for reading by the patient to produce the desired freeway space relationship between the incisals and the exposed surface of the gauge plates on the opposite denture base plate when the patient reads the chart before the dentist. The words on the chart are chosen to produce sibilants and similar phonetic combinations resulting in the close proximity of the incisals to the exposed surface of the gauge plates, with the lips of the patient open during the pronunciation of such words for observation by the dentist and determination of the proper freeway space for both chewing and unimpaired speech.

13 Claims, 9 Drawing Figures

PATENTED OCT 9 1973 3,763,565

METHOD AND APPARATUS FOR ESTABLISHING PROPER INTEROCCLUSAL DISTANCE FOR EDENTULOUS DENTURE PATIENTS

SUBJECT MATTER AND OBJECTS OF THE INVENTION

This invention relates to new and useful improvements in methods and apparatus for establishing proper interocclusal distances or freeway space between the upper and lower dentures of edentulous patients.

Heretofore, it has been necessary for the dentist to estimate, on the basis of the individual experience and measurements or guesses, the proper vertical or interocclusal distance for most effective chewing or masticating of food stuffs by a patient with full dentures, and for proper speech function when using the dentures.

Full dentures should fulfill two separate functions in the mouth of a toothless patient. One, to restore impaired speech and eliminate objectionable clicking sounds or whistling sounds in the speaking function of the patient or user of the dentures. Two, to provide proper relationship between the upper and lower dentures to masticate foods efficiently for good health conditions and for proper digestion thereof by the denture wearer. Aesthetics also enters into the fitting of the dentures, as does the physical comfort of the wearer. In order to chew most efficiently, it is desirable that a very definite "freeway" space must exist between the occlusal surfaces of all posterior teeth which nature has provided for by the tonus of all involved muscles and tissues. In order to speak most efficiently, proper freeway space must exist for unimpaired speech, so that whsitling sounds or clicking resulting from the striking of the denture teeth together does not result from improper positioning of the anterior as well as the posterior teeth of the dentures.

In the past, dentists have used the relaxed mandible position, the profile of the face, phonetics and pronunciation of selected words with different sounds, which bring the teeth closest together during speech function, but yet make provision of freeway space to prevent striking the teeth against each other, to prevent clicking sounds of dentures or whistling between the dentures and to provide the proper freeway space for chewing without upsetting the proper tonus of all tissues and muscles during mastication.

It is therefore one object of this invention to provide a new and improved method and means for determining the proper vertical interocclusal distance for the teeth of the upper and lower dentures.

It is a particular object of the invention to provide a method and apparatus which will enable a dentist to fit upper and lower dentures in the mouth of a patient for proper interocclusal spacing or determination of vertical dimension to assure normal movement and establishment of a normal freeway space between the teeth of the upper and lower dentures under conditions of normal use of the dentures by the wearer.

A further object of the invention is to provide means for more quickly and easily determining the proper vertical dimension or freeway space between upper and lower full dentures.

Still another object of the invention is to provide means which will enable the dentist to visually more correctly determine the proper freeway space between the dentures without the necessity of frequent modifications of the dentures.

Still another object of the invention is to provide a method and apparatus of the character set forth in which the determination of the proper interocclusal distance is effected in a sanitary manner, and a comfortable manner to the patient, in a short time.

Still another object of the invention is to provide means for determining the proper interocclusal distance between the dentures, which means includes a plurality of magnetic gauge plates of predetermined thickness stacked and magnetically held in stacked relationship on a supporting platform carried by the lower denture base plate.

Still another object of the invention is to provide a means for eliminating the necessity for building up a block of "speaking wax," or a white wax pad, in the central incisal area of the lower denture which is carved or built up as required by the dentist in determining the proper interocclusal distance, so that the wax carvings or need for wax additions may be eliminated, to produce a quicker, more sanitary and neater operation in establishing the desired proper freeway space.

A particular object of the invention is to provide a method of determining proper freeway space between upper and lower dentures of edentulous patients by manipulation by the patient of his mandible in a normal manner during speaking functions by reading a series of words or a sentence on a phonetic chart or card with the lips opened by the patient in a normal manner, to expose the incisals of the upper central incisors as opposed to the lower incisor edges represented by the upper surface of the stack of magnetic gauge plates in the lower denture base plate, so that freeway space is observed during normal speech function and the dimensions of the vertical opening can be established properly.

The invention is therefore directed to the method of and apparatus for establishing a proper interocclusal distance or freeway space between the incisal edges of the upper central incisors of the upper denture and the incisal edges of the centrals of the lower denture represented by the upper surface of the upper one of a stack of magnetic gauge plates supported on a platform on the lower denture base plate, wherein the natural movements of the jaw and speaking components of the patient's mouth are observed during normal movement resulting from reading a predetermined selected series of words or sentences in which phonetic syllables or combinations of syllables are spoken by the patient to bring the teeth into closest non-interfering relationship of the teeth of the upper and lower dentures.

BRIEF DESCRIPTION OF THE DRAWINGS

Additional objects and advantages of the invention will be readily apparent from the reading of the following description of a device constructed in accordance with the invention, and reference to the accompanying drawings thereof, wherein.

DESCRIPTION OF THE METHODS AND APPARATUS OF THE INVENTION

In carrying out the method of the invention, the dentist prepares the usual master casts or stone models of the patient's upper and lower configuration and structure, which are made in the usual manner. These stone models are then positioned on an articulating machine in what the dentist believes to approximate the proper centric and vertical opening relationship by use of upper and lower wax bite rims prepared in the usual manner, as for example in the manner set forth in the U.S. Pat. of H. H. Faust et al., No. 3,557,453, dated Jan. 26, 1971. The upper and lower bite rims are returned with the master casts to the laboratory or technician for the forming of an upper anterior wax try-in, involving the setting of the six anterior incisor teeth according to lip line, median line, and contoured wax rim as prescribed by the dentist. This try-in serves as means for aesthetic evaluation by the dentist and his patient. The distance from the incisals of the upper centrals down toward the lower ridge constitutes and completes the interocclusal vertical opening.

Figure 1:
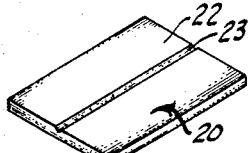
FIG. 1 is an isometric view, from above, of a magnetic gauge plate for use in practicing the method of the invention.
Figure 2:
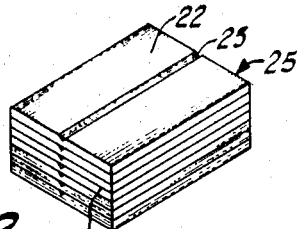
FIG. 2 is a similar view of a plurality of magnetic gauge plates stacked to provide a predetermined vertical dimension.
Figure 3:
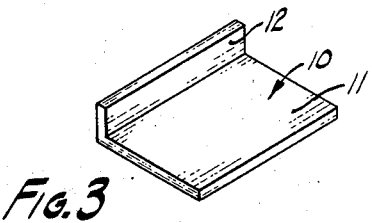
FIG. 3 is a similar view of a platform for supporting the gauge plates on a denture in carrying out the method of the invention.
Figure 4:
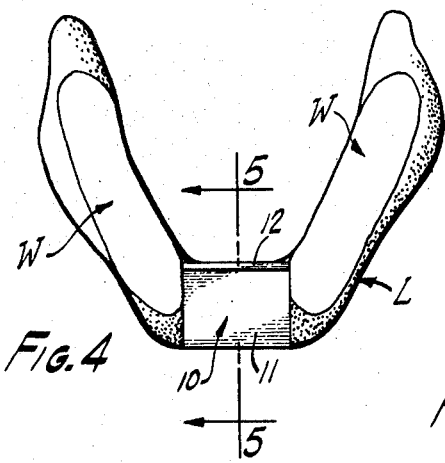
FIG. 4 is a top plan view of a lower denture having the platform of FIG. 3 secured thereto in position for use.
Figure 5:
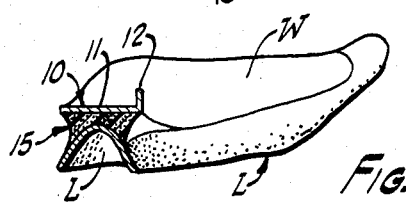
FIG. 5 is a cross-sectional view taken on the line 5 — 5 of FIG. 4.

The lower base plate is then built up to meet the incisals of the upper centrals by affixing a metal supporting platform 10, of the character illustrated in FIG. 3, to the anterior central ridge of the lower base plate, as shown in FIG. 4. The supporting platform is fixed with its planar supporting surface or base portion 11 in a horizontal position over the anterior central ridge of the lower base plate L by sticky wax compound 15, used in the usual manner. An upstanding stop flange 12 at the rear edge of the planar supporting surface 11 is positioned over the inner or lingual portion of the ridge of the lower base plate L, as shown in FIGS. 4 and 5, and the platform is adapted to receive a stack 25 of magnetic gauge plates 20 such as is shown in FIGS. 1 and 2. The stack 25 of the gauge plates is caused to be secured to each other in relatively immovable relationship by the magnetic character of the plates. The plates are formed of a magnetic material, which is shaped in a rectangular configuration, preferably of approximately 20 millimeters longitudinal and approximately 12 millimeters lateral dimension, and of uniform thickness of one-half or one millimeter each. The plates are preferably formed by cutting from a bar of magnetic material so that the magnetic field extends through the thickness of the plates from the lower surface 21 of the plate to the upper surface 22 thereof, in order that the plates will be attracted toward each other, and will adhere to each other when stacked in proper magnetic relationship. The polarity, or the north and south poles of the magnets of the plates, is indicated by an easily noticed groove 23 formed in one surface of the gauge plates 20, which may be North pole of the magnetic field, while the other ungrooved surface or bottom surface 21 may be the South pole. The gauge plates are marked with the groove as they are formed and ground to proper thickness. The mark facilitates handling and positioning of the plates in the stack on the platform and assures proper magnetic positioning of the plates with respect to each other.

It is readily apparent that by making the plates each of one millimeter thickness, a uniform measurement of the distance between the upper surface of the upper one of the stack of gauge plates and the incisal edge of the upper central anterior teeth UC of the upper denture U may be obtained, as will be hereinafter more fully explained. If desired, of course, the thickness of the gauge plates may be one-half millimeter for more precise measurements of the vertical opening, though it is believed that the 1 millimeter thickness is entirely suitable.

Figure 6:
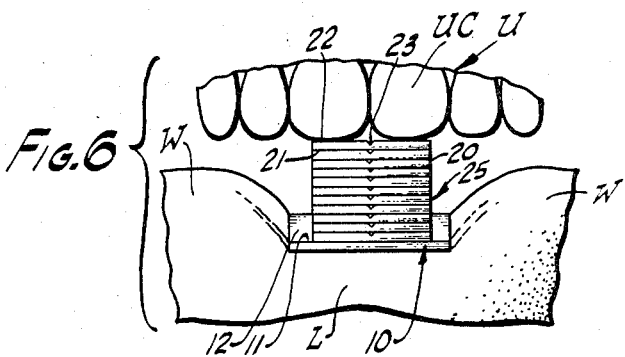
FIG. 6 is a fragmentary front elevational view of a lower denture base plate and a portion of an upper anterior try-in denture, showing the manner in which the magnetic gauge plates and platform of the invention are used.

When the platform 10 has been mounted on the lower base plate by the sticky wax 15, with the supporting surface or base portion 11 thereof in the horizontal position, and denture wax ridges W have been formed along the upper surface of the lower denture above the ridges to provide a comfortable feel to the patient, a sufficient stack 25 of the magnetic gauge plates 20 is mounted on the platform 10 of the lower base plate, as shown in FIG. 6, to conform to the vertical spacing previously established by the dentist using the wax bite rims. With the magnetic gauge plates 20 in place on the lower base plate, the upper denture try-in with the upper anterior teeth thereon is inserted into the mouth of the patient, and the lower denture base plate L is disposed in the patient's mouth with the gauge plates thereon, as shown in FIG. 6. The dentist now is provided with means for checking or comparing the previously established vertical opening and making such changes as may be required. Additional magnetic gauge plates may be forwarded with the dentures to the dentist for this step.

Figure 7:
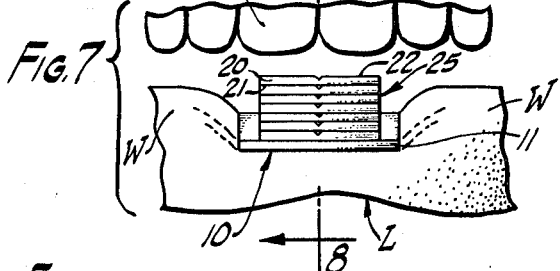
FIG. 7 is a view similar to FIG. 6, showing a further step in carrying out the method of the invention.

In determining by an accurate phonetic test the proper vertical spacing dimension of the dentures for the patient, the dentist and the patient face each other, after the denture anterior try-ins have been inserted in the mouth of the patient, and a series of phonetic syllables are enunciated by the patient, either as a result of oral suggestion by the dentist of the words to be used and the syllables to be pronounced, or preferably by the use of a phonetic reading chart or card having a plurality of words or a sentence in which a series of words having "s" or "ch" sounds therein positioned for reading by the patient in a normal upright standing or sitting position, so that the movements of the jaw by the muscular and bone structure during the test are of the normal type utilized by the patient during the functions of reading or speaking. If the vertical dimension previously determined by the dentist has been opened too greatly, at the preliminary wax rim fitting step, the incisals of the upper centrals will bump or strike against the upper surface of the upper gauge plate of the stack 25 of gauge plates on the platform carried by the lower denture base plate, when the patient is pronouncing the "s" or "ch" sounds in the sentences or words. This not only can be visually ascertained by the dentist, but the clicking sound can also be felt and heard by the patient. It is important that the "s" and "ch" sounds be so chosen that the lips of the patient are open in a normal manner during pronunciation thereof to permit the dentist to observe the position of the incisals of the upper central incisor teeth with respect to the upper surface of the upper plate of the stack of gauge plates on the lower denture base plate. If the vertical has been over-opened, one or more gauge plates may be removed from the stack until the space between the upper surface 22 of the upper gauge plate of the stack 25 on the lower denture is spaced approximately 2 millimeters from the incisal edge of the upper central incisor teeth of the upper denture try-in. It has been determined over many years that a proper vertical spacing or freeway space is approximately one and one-half to three millimeters between the incisal edges and occlusal surfaces of the upper teeth and the incisal edges and occlusal surfaces of the lower teeth of the dentures during the speaking function. Thus, one or more of the upper gauge plates 20 may be removed from the stack 25, as shown in FIG. 7, until the upper surface 22 of the upper gauge plate is spaced a distance of between 1 and ½ and 3 millimeters from the lower incisal edge of the upper anterior central incisor teeth, and so the proper freeway space is determined and established with great accuracy.

Similarly, should the vertical have been over-closed, so that more than two millimeters space remains visible between the upper surface 22 of the upper gauge plate 20 of the stack 25 and the lower incisal edge of the upper central incisors of the upper denture, additional gauge plates may be added to the stack until the proper 1 and ½ to 3 millimeters of freeway space is established.

Thus, it is possible, by simply adding or removing the magnetic gauge plates one at a time, to establish the desired freeway space which is so essential to unimpaired speech and articulation of words, as well as for maximum chewing efficiency during mastication of food stuffs.

The magnetic gauge plates are held tightly on the supporting platform 10 by the magnetic force of the plates during the operation, and it is not necessary to continuously or frequently remove and reinsert the lower denture for reducing, carving or building up a ridge or pad on the lower dentures to determine the proper vertical opening, as has been the case in the past. Instead, merely inserting or removing one or more of the upper gauge plates from the stack 25 on the platform 10 will determine the proper vertical or interocclusal freeway space between the dentures of the patient. This is also accomplished in a clean, sanitary and quick manner, and without filling the patient's mouth with carvings.

At the time the vertical re-check is being carried out in the manner just described, the dentist also performs the usual check on the upper anterior teeth for aesthetics as to size, shade, shape, mould, and the like. After the vertical and freeway distance has been properly determined as has been set out, the try-in dentures are returned to the laboratory with the stone masters, and are installed on an articulating machine in the usual manner with the incisal edges of the central anterior teeth UC of the upper denture U in engagement with the upper surface 22 of the stack 25 of magnetic gauge plates 20 secured on the lower denture base plate L. If desired a suitable retaining means such as a rubber band or the like may be placed around the stack of magnetic gauge plates to prevent disloding the same during transportation to the laboratory from the dentist, or a notation may be made on the prescription form of the proper number of magnetic gauge plates in the stack on the platform.

Figure 8:
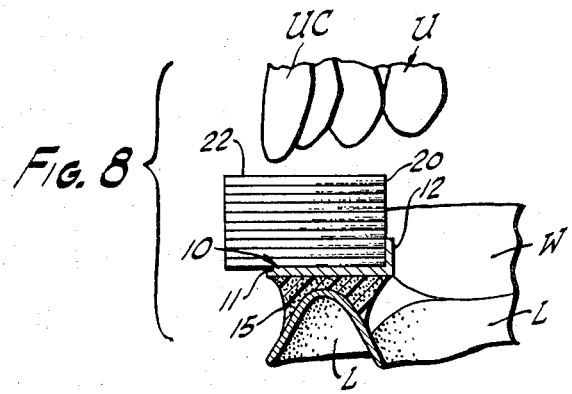
FIG. 8 is a vertical sectional view taken on the line 8 — 8 of FIG. 7.
Figure 9:
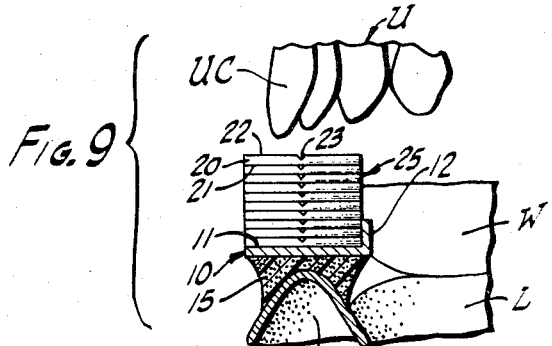
FIG. 9 is a view similar to FIG. 8 showing the gauge plates moved to another position on the platform.

Furthermore, the magnetic gauge plates provide for fitting and properly establishing the freeway space in cases of extensive horizontal overjet, of either a prognatic mandible or a restrusive mandible of the type illustrated in FIG. 8. In these cases, the stack of gauge plates is so mounted on the platform 10 that the major or longitudinal rectangular dimension is disposed extending along a mesial anterior-posterior line, so that the incisal edges of the opposing incisor teeth will engage the exposed surface 22 of the exposed gauge plate 20 of the stack. Should the patient's dental structure not involve extensive horizontal overjet, but is more nearly normal, the stack 25 of the gauge plates may be positioned in the manner shown in FIG. 9 with the major or longitudinal rectangular dimension extending parallel to the retaining flange 12 of the platform 10. This structural arrangement produces a comfortable fit in the mouth of the patient when the dentures are being prepared. Extensive overjet conditions such as are shown in FIGS. 6, 7 and 8, may also be accommodated more comfortably when fitting the dentures for such a patient, and the shifting of the position of the guage plates on the platform will provide for a quick and ready ascertainment of the proper vertical interocclusal distance or freeway space of the dentures of the patient, either with or without extensive horizontal overjet, without the necessity of re-building a pad or rim on the lower denture. The magnets may be simply turned on the platform from the position shown in FIG. 9 to the position shown in FIGS. 6 through 8, or vice versa, to accommodate either condition of horizontal overjet comfortably for the patient.

It is desirable, of course, that a good adhesive powder or paste be applied in both base plates during the speech exercise, to prevent displacement of the base plates and the accessories thereon or the shifting of the base plates on the ridges of the patient, and so give the patient a more secure and comfortable feeling and obtain more normal movements of the muscular, bone, ligaments, skin and tissues of the patient during the tests for determination of the proper freeway space in the manner described. This is essential to obtain a more satisfactory and comfortable relationship of the dentures in use in the mouth of the wearer.

After the freeway space or vertical interocclusal distance has been determined as has been explained, the stone models are set on the articulating machine in the usual manner with the incisal edges of the upper central incisor teeth in engagement with the upper surface 22 of the upper gauge plate 20 of the stack 25 of gauge plates on the supporting platform 10 secured to the lower denture base plate, and the vertical front pin or set screw adjusted to such position. This then enables the technician to prepare the dentures for the application of artificial teeth thereto in any suitable manner, but preferably in the manner set forth in the U.S. Pat. to Faust et al, No. 3,557,453, using the method set forth therein to produce a more natural occlusal plane that is compatible with the chewing complex and centric relationship of the dentures and to provide a superior set of dentures for the patient.

Obviously, while the magnetic gauge plates have been illustrated and generally described as supported on a platform 10 secured to a lower denture base plate, it is readily apparent that the platform may be secured to the upper denture base plate when desirable and that the magnetic characteristics of the gauge plates will hold them in place thereon. The same measurement procedures are followed in either case.

The magnetic gauge plates have been made of a barium ferrite material, but may be made of any other material, or by any other process desired.

It will thus be seen that a new and improved method and apparatus has been provided for determining the proper interocclusal distance or freeway space between upper and lower full dentures for most efficient chewing ability and unimpaired speech. It will also be seen that the method provides for quick, sanitary and comfortable determination of the freeway space with full accuracy and ease, and with a minimum number of fittings.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A method of determining proper vertical interocclusal space between the upper and lower teeth of full dentures which includes: supporting on the anterior central ridge portion of one of the denture base plates of the upper and lower dentures base plates of said dentures a stack of a plurality of gauge plates having an exposed planar surface thereon disposed opposite the central anterior incisors of the opposite denture base plate; determining the proper desired interocclusal spacing of the incisal edges of said central anterior incisor teeth on said opposite denture base plate with respect to the exposed planar surface of the stack of gauge plates on said one denture base plate, from movements of the patient's mandible with respect to his maxilla during speech or simulated speech while said denture base plates are in position in the mouth of the patient for whom the dentures are being prepared, by adding or subtracting individual gauge plates from the stack thereof on said one denture base plate to position the exposed surface of said stack of gauge plates to provide said proper desired interocclusal space or opening between said incisal edges and said exposed surface.

2. The method of claim 1 which includes: holding the gauge plates in a stack on said one denture base plate magnetically.

3. The method of claim 1 including: the step of supporting the upper and lower denture base plates on stone models fixed to an articulator machine after the proper desired interocclusal spacing has been determined; and moving the incisal edges of the central anterior incisor teeth on said opposite denture base plate into engagement with the exposed gauge plate surface of the stack of gauge plates supported on said one denture base plate opposite said incisor teeth on said opposite denture base plate to fix the vertical dimension for the dentures on the articulating machine.

4. A method of determining proper vertical interocclusal space between the teeth of full dentures which includes: preparing an upper base plate and a lower base plate; fitting anterior incisor teeth to the upper base plate to form an upper try-in; fitting a supporting platform to the anterior central portion of the ridge of the lower base plate to provide a substantially horizontal supporting surface above said ridge spaced a substantial distance below the expected occlusal plane of the dentures; supporting magnetic gauge plates on said supporting surface in a stack of a plurality of plates each of predetermined thickness extending to the approximate occlusal plane of the dentures; fitting the upper denture try-in and the lower denture base plate having the gauge plates thereon in the mouth of the patient for whom the dentures are being prepared; and determining the proper freeway opening between the teeth of the dentures from movements of the wearer's mandible with respect to the maxilla during pronunciation of preselected phonetic words or phrases by adjusting the height of the stack of gauge plates to that which produces the desired freeway space or interocclusal space between the incisals of the anterior central incisors of the upper denture and the upper surface of the stack of gauge plates supported on the lower denture base plate by adding to or removing from the stack one or more separate gauge plates to produce the desired freeway opening or space.

5. The method of claim 4 including the additional step of transferring the base plates of the upper and lower dentures to an articulator and adjusting the vertical height or dimension by engaging the incisals of the upper incisor teeth with the upper exposed surface of the upper gauge plate of the stack of gauge plates on the lower denture base plate.

6. The method of claim 5 including: the additional step of fitting teeth to the upper and lower base plates along an occlusal plane determined to be compatible to the vertical dimension previously determined by use of the gauge plates.

7. Apparatus for establishing a proper vertical occlusal spacing between the teeth of full dentures which includes: a supporting platform having a base adapted to be mounted on the anterior incisor ridge portion of one of the denture base plates for said dentures opposite the central incisor teeth of the opposite denture base plate and a projecting stop flange on one edge; a plurality of identical separate substantially rectangular gauge plates each having opposed parallel planar surfaces spaced apart a predetermined distance; means for holding said gauge plates in a stack supported on the base of said supporting platform positioned by said stop flange with the planar surfaces of each gauge plate abutting the complementary planar surface of adjacent gauge plate or plates in said stack.

8. Apparatus for establishing a proper vertical occlusal spacing between the teeth of full dentures of the character set forth in claim 7 wherein each of said separate gauge plates comprises a magnetic substantially rectangular gauge plate having opposed parallel planar surfaces spaced apart a predetermined distance; the magnetic field of said gauge plates providing said means for holding said gauge plates in a stack with the planar surfaces of each gauge plate abutting the complementary planar surface of adjacent gauge plates in said stack; and means is provided on each gauge plate indicating the polarity of the magnetic field of said gauge plate.

9. Apparatus for establishing proper vertical occlusal spacing between the teeth of full dentures which includes: a metallic supporting platform adapted to be secured to a lower denture base plate above the anterior central ridge of said base plate to provide a supporting surface thereon; a plurality of separate gauge plates of predetermined thickness supported on said platform in a stack rising vertically above said ridge portion and providing an exposed surface on the upper gauge plate disposed to be engaged by the incisal edges of the central anterior incisor teeth on the upper denture base plate; and means for releasably securing each of said gauge plates to the platform and to each other in said stack.

10. Apparatus of the character set forth in claim 9 wherein each of the gauge plates is magnetic and has means thereon for indicating the polarity of the magnetic field of said gauge plate to facilitate assembling a plurality of said gauge plates in a magnetically held stack.

11. Apparatus of the character set forth in claim 9 wherein the supporting platform comprises: a planar base portion substantially rectangular in configuration; a stop flange along one longitudinal edge of the substantially rectangular base portion and extending vertically with respect to said base portion for positioning the stack of gauge plates on said planar base portion.

12. Apparatus of the character set forth in claim 11 wherein each of said gauge plates is substantially rectangular and has a greater longitudinal dimension than lateral dimension, and said gauge plates when positioned on said planar base portion are adapted to engage the retaining flange of the supporting platform along either the longitudinal dimension edges thereof or the lateral dimension edges to accommodate varying conditions of horizontal overjet.

13. The method of claim 1 which includes: the step of securing a metallic supporting platform to the anterior central ridge of said one denture base plate; and securing a plurality of separate magnetic gauge plates of predetermined thickness to said platform to form said stack of gauge plates.

* * * * *